(12) United States Patent
Campardo et al.

(10) Patent No.: US 6,286,086 B1
(45) Date of Patent: Sep. 4, 2001

(54) DATA PROTECTION METHOD FOR A SEMICONDUCTOR MEMORY AND CORRESPONDING PROTECTED MEMORY DEVICE

(75) Inventors: Giovanni Campardo, Bergamo; Stefano Ghezzi, Treviolo; Giuseppe Giannini, Agrate Brianza; Piero Enrico Torricelli, Cavenago Brianza, all of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/220,127

(22) Filed: Dec. 23, 1998

(30) Foreign Application Priority Data

Dec. 24, 1997 (EP) .................................. 97830717

(51) Int. Cl.[7] ...................................... G06F 12/14
(52) U.S. Cl. ...................... 711/163; 711/164; 710/200; 713/202
(58) Field of Search ................................... 711/163, 164, 711/155; 713/202; 710/200; 365/200

(56) References Cited

U.S. PATENT DOCUMENTS

| | | | |
|---|---|---|---|
| 4,744,062 | 5/1988 | Nakamura et al. | 365/185.04 |
| 5,117,388 * | 5/1992 | Nakano et al. | 365/73 |
| 5,206,938 | 4/1993 | Fujioka | 711/200 |
| 5,357,573 * | 10/1994 | Walters | 380/25 |
| 5,434,999 | 7/1995 | Goire et al. | 395/712 |
| 5,619,671 * | 4/1997 | Bryant et al. | 395/412 |
| 5,691,945 | 11/1997 | Liou et al. | 365/200 |
| 5,978,915 * | 11/1999 | Lisart et al. | 713/200 |

* cited by examiner

Primary Examiner—Hiep T. Nguyen
(74) Attorney, Agent, or Firm—Theodore E. Galanthay; Charles J. Rupnick; Seed Intellectual Property Law Group PLLC

(57) ABSTRACT

A method of protecting data in a semiconductor electronic memory, which includes using a protected memory portion within the matrix and respective dedicated decoding portions for storing, into the protected portion, a protection code without the address area of the matrix. The protection code can only be written and/or read through a command interpreter.

13 Claims, 1 Drawing Sheet

DATA PROTECTION METHOD FOR A SEMICONDUCTOR MEMORY AND CORRESPONDING PROTECTED MEMORY DEVICE

TECHNICAL FIELD

This invention relates to a method of protecting data in a semiconductor electronic memory having a memory matrix and respective matrix address decode and pre-decode blocks.

The invention also relates to a semiconductor electronic memory device having a protection function for the data stored therein, and being of a type which comprises a memory matrix and respective matrix address decode and pre-decode blocks.

Semiconductor memories are used in apparatus of ever more sophisticated design and expanding acceptance which require protection for the data stored therein.

The term "protection" may either encompass:

protection from unintentional writing or erasing; or protection from tampering in order to extract or modify the memory contents.

The invention is particularly, but not exclusively, concerned with the latter type of protection, and the ensuing description will cover this field of application for convenience of explanation.

BACKGROUND OF THE INVENTION

As is known, in semiconductor memories, conditional access must be provided to certain memory portions. An ability to defeat deceptive attempts carried out by reading from the interdicted areas of such memories is of paramount importance. For example, data relating to the protection code CP of the memory would be stored in such areas.

On the other hand, semiconductor memories have other areas where information is stored which can be read and/or modified in the usual manner. Thus, the situation is one where different memory areas may or may not be conceded to reading.

In addition, a semiconductor memory usually includes areas containing program instructions to be executed.

The simplest way of providing a safety feature includes using a decoding code DEC, also known as the access or identification code, which usually comprises a few bytes or memory words. Without this decoding code, no consistent data can be read from the memory, nor can the contents of previously stored data be modified.

Thus, the location Xdec of the decoding code DEC is critical to the achievement of improved safety for a semiconductor memory.

In particular, the location Xdec of the decoding code DEC should meet certain basic requirements, as follows:

it should be a read-only area, or at least an area which is only intelligible to the manufacturer in possession of the decoding code DEC;

it should be an unmodifiable area under any conditions of the memory operation; and it should be an area readily accessible at the fabrication stage and later on for servicing.

It should be considered, in fact, that the memory write time is a critical parameter at its fabrication stage. In particular, providing easily accessed memories is important if this write time is to be reduced.

A first prior approach to filling this demand includes using some memory locations of unknown address into which the bytes of the protection code CP could be stored. The reliability of this prior method is dependent on two features:

the address at which the protection code CP has been stored is unknown; and in any event, the data stored at that address cannot be interpreted directly.

However, this first protection method has certain unfavorable features which make it complicated to apply and lower its safety level.

In conventional semiconductor memories, these memory locations for the bytes of the protection code CP can only be provided within a memory array shared with the data. It is, therefore, necessary to use a software program for the write step which can memorize and avoid memory bits already in use.

However, the problem arises of how to erase the whole memory, or whole sections thereof which might contain bytes of the protection code CP. This problem is intensified in the instance of semiconductor memories of the flash type.

In this situation, the erase operation must be preceded by a temporary saving of the memory protection code CP. For the purpose, a temporary or buffer memory may be used from which the protection code CP can later be read for re-writing to the bytes re-assigned thereto.

Consequently, a protection method of that type tends to complicate both the hardware and the software of the semiconductor memory. In particular, the step of copying the protection code CP during the semiconductor memory fabrication process represents an unacceptable waste of time in such applications as cellular phones.

Furthermore, since the bytes of the protection code CP are written and erased using standard commands, anybody would be able to damage or read the protection code CP contained therein, and possibly fully interpret it without the decoding code DEC.

SUMMARY OF THE INVENTION

An embodiment of the invention provides a truly effective data protection method is based on the following considerations:

it is convenient that the address space reserved for the protection code CP is locates outside the memory array into which standard data is written;

the protection code CP can be written only once and cannot be erased;

it is of advantage that different write/read procedures be used which differ, but not to a substantial extent, from standard; in fact, slightly modified write/read procedures would allow a managing software to be used which is basically similar as that used for standard operations.

The embodiment provides a data protection method for semiconductor memories, and a protected memory configuration, which have such structural and functional features as to overcome the drawbacks of prior protection methods and semiconductor memories.

The embodiment is directed to a protection method which utilizes an OTP (One Time Programmable) memory area, and can meet all of the above requirements regarding safety, reliability, and ease of access, for a protected memory configuration in accordance with the method.

Specifically, the embodiment uses a small, suitably configured portion of the standard memory array, and does not require that more than two extra instructions be added to the standard instruction sequence for the memory read/write operations.

The features and advantages of the protection method and memory device according to the invention will be apparent from the following description of a non-limiting embodiment thereof, given with reference to the accompanying drawings.

DETAILED DESCRIPTION OF THE INVENTION

Figure 1:
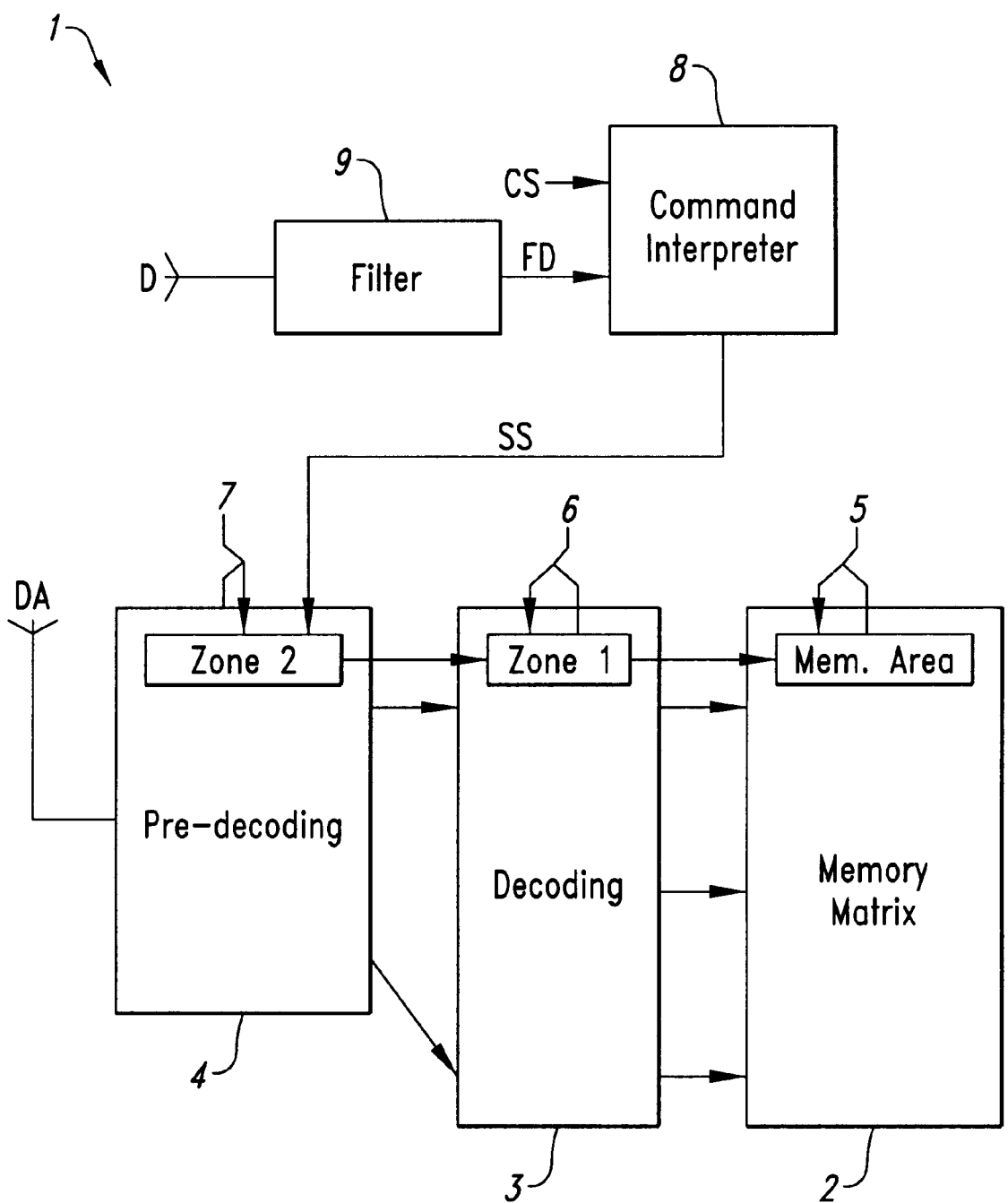
FIG. 1 shows a protected memory configuration implementing the data protection method of the invention.

Referring to the drawing figure, generally and schematically shown at 1 is a semiconductor memory device having a memory matrix or configuration 2 according to this invention.

The semiconductor memory device 1 also includes a decoding block 3 having its output connected to the memory matrix 2 and its input connected to a pre-decoding block 4 which is input memory addresses DA to be accessed.

In particular, the memory configuration 2 includes a protected OTP memory area 5 connected to first 6 and second 7 special decoding zones for the protected memory area 5. The first and second special decoding zones, 6 and 7, are connected in the decoding block 3 and the pre-decoding block 4, respectively.

The semiconductor memory device 1 further includes a command interpreter 8 which is input control signals CS and suitably filtered data values FD.

Advantageously in this invention, these suitably filtered data values FD are produced from a programmable code filter 9 which is input the original data D.

In addition, the command interpreter 8 outputs a selection signal SS which is connected to the protected OTP memory area 5 through a series of the first and second special decoding zones 6 and 7.

A protected memory configuration according to an embodiment of the invention basically comprises the combination of the memory configuration 2, itself comprised of the protected OTP memory area 5 and the first 6 and second 7 special decoding zones, and the programmable code filter 9.

Thus, a data protection method of this invention involves the use of a protected OTP memory area additionally to the standard data memory array in the semiconductor memory device 1.

The size of this additional area 5 is dependent on the number of bytes used for storing the protection code CP. For example, in a cellular phone type of application, OTP memory rows could be introduced into the memory matrix 2 and in part used directly by the manufacturer to counteract the serious problem of "cloning".

The data protection method further comprises the addition of two instructions, which can be interpreted by the command interpreter 8, specifically an OTP read instruction ("read OTP data") and an OTP program instruction ("program OTP data"), no erase instruction being provided for the protected OTP memory area 5.

Advantageously in this invention, these read and program OTP instructions may differ to suit individual customer's requirements.

The decoding code DEC comprises essentially these particular instructions for the protected OTP memory area 5.

In summary, the data protection method, and corresponding protected memory configuration, according to the invention afford the following advantages:

the protection code CP stored in the protected OTP memory area cannot be lost, does not belong to the standard address area of the memory array, and can only be read and/or written if the appropriate instructions are known; this provides a high safety level for the protection code CP;

at the designing stage, the protected OTP memory area will require some additional elements (rows and/or columns) involving a trivial (zero, for cellular phone applications) increase in memory area occupation, and permit the use of standard decoding methods; accordingly, no additional address bits will be required, the OTP read and program instructions re-addressing the address bus;

the command interpreter 8 can be reprogrammed through the programmable code filter 9; this allows the OTP read and program instructions to be customized, thereby raising the safety level of the protection code CP even further;

by using only slightly modified OTP read and program instructions, existing circuitry (such as the decoding block 3, pre-decoding block 4, and command interpreter 8) in the semiconductor memory device can be utilized.

The solution illustrated in relation to the protection code CP of a semiconductor memory device 1 can also be used for any data to be stored on a permanent basis. Such data, therefore, should remain unaltered even after the whole memory array containing it has been erased.

Where the solution proposed by this invention is used, it becomes unnecessary to save the permanent data prior to erasing in order to have it restored at the end of the erase operation.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method of protecting data in a semiconductor electronic memory comprising a memory matrix and respective matrix address decoding and pre-decoding blocks, a protected memory portion within said matrix and respective dedicated decoding portions, the method comprising:

storing a protection code into said protected memory portion;

receiving in said dedicated decoding portions an instruction to access said protection code;

decoding in said dedicated decoding portions the instruction to access said protection code; and accessing said protection code using the decoded instruction.

2. A method according to claim 1, wherein said protection code can only be written and/or read through a command interpreter.

3. A method according to claim 1, wherein said protected memory portion is a one time programmable memory portion.

4. A method according to claim 1, wherein said protection code can be written and/or read using a decoding code.

5. A semiconductor electronic memory device having a protection function for data stored therein, the memory device comprising:

a memory matrix;

a pre-decoding block having a memory address to be decoded;

a decoding block having an input connected to the pre-decoding block and an output coupled to the memory matrix;

a protected memory portion incorporated with said matrix;

a command interpreter receiving control signals and having an output coupled to said protected memory portion;

a programmable code filter having a data input and an output connected to an input of the command interpreter; and a plurality of dedicated decoding portions having an input coupled to the output of the command interpreter and an output coupled to the protected memory portion, the dedicated decoding portions being structured to decode a selection signal from the command interpreter and, in response to the selection signal, access the protected memory portion.

6. A device according to claim 5, wherein said protected memory portion is a one time programmable memory portion.

7. A device according to claim 5, wherein said dedicated decoding portions are incorporated to the decoding block and the pre-decoding block, respectively.

8. A device according to claim 5, wherein the output from the command interpreter is coupled to said protected memory portion through a series of said dedicated decoding portions.

9. A memory system, comprising:

a memory matrix for storing information, the memory matrix including an unprotected portion from which data can be erased and a protected portion from which data cannot be erased;

a command interpreter coupled to the memory matrix, the command interpreter being programmed with a special instruction that reads the protected portion without reading the unprotected portion; and a decoder coupled between the command interpreter and the memory matrix, the decoder having a decoding portion dedicated to the protected portion of the memory matrix and accessible by the special instruction of the command interpreter.

10. The memory system of claim 9, further comprising a pre-decoder coupled between the command interpreter and the decoder, the pre-decoder having a pre-decoder portion dedicated to the dedicated decoding portion of the decoder and to the protected portion of the memory matrix.

11. The memory system of claim 9 wherein the protected portion of the memory matrix is a one time programmable memory portion.

12. The memory system of claim 9, further comprising a programmable code filter coupled to the command interpreter, the programmable code filter being structured to program the special instruction in the command interpreter.

13. The memory system of claim 9 wherein a protection code is stored in the protected area, the memory matrix being unreadable without access to the protection code.

* * * * *